2,783,751
Patented Mar. 5, 1957

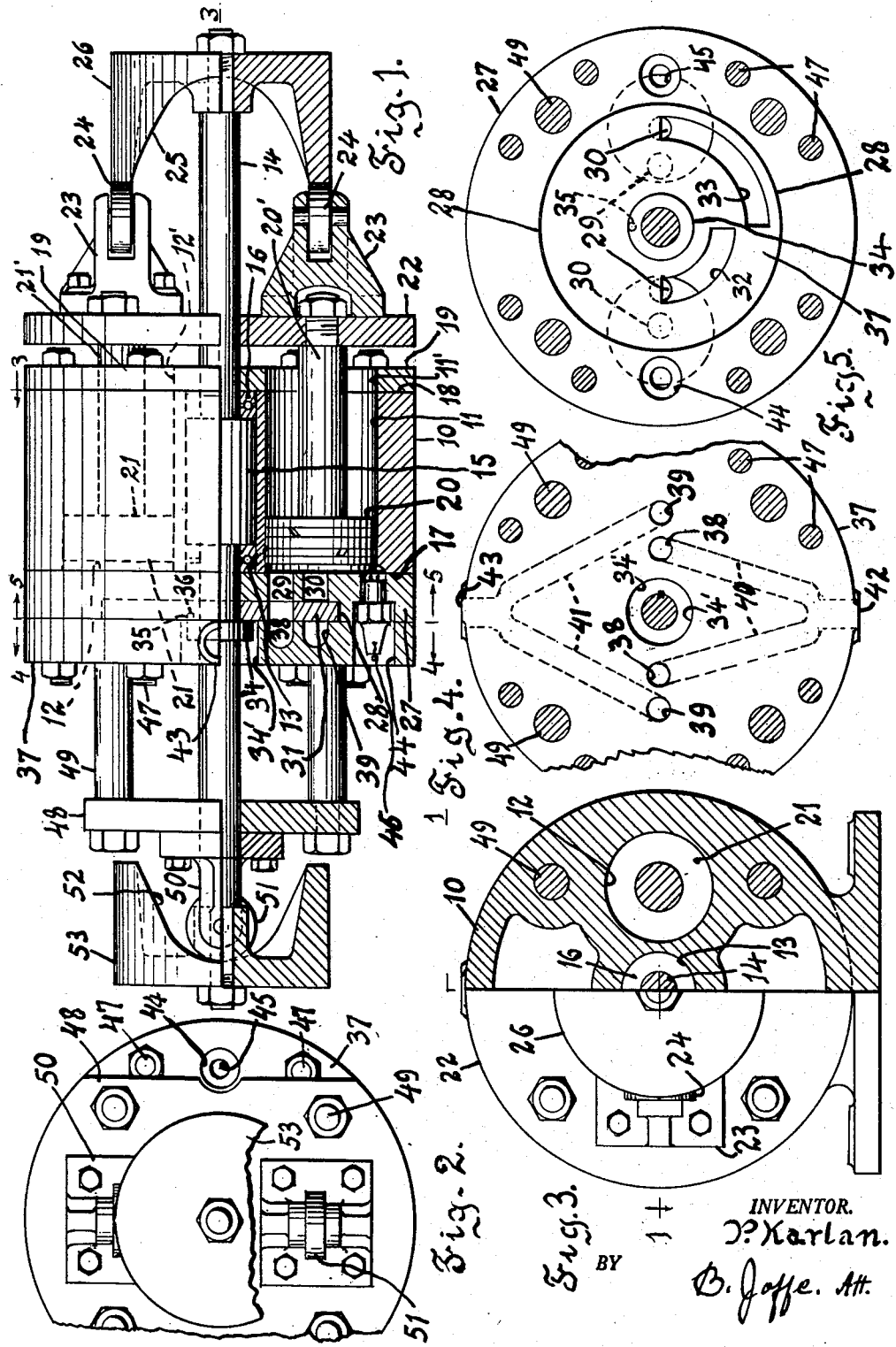

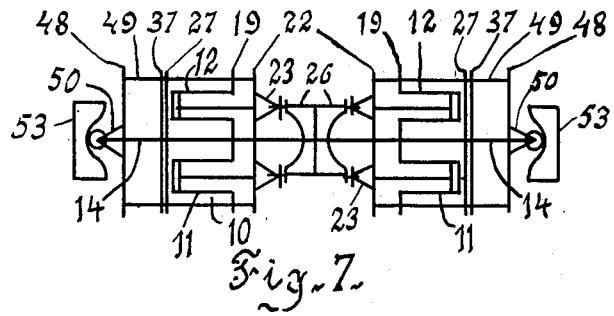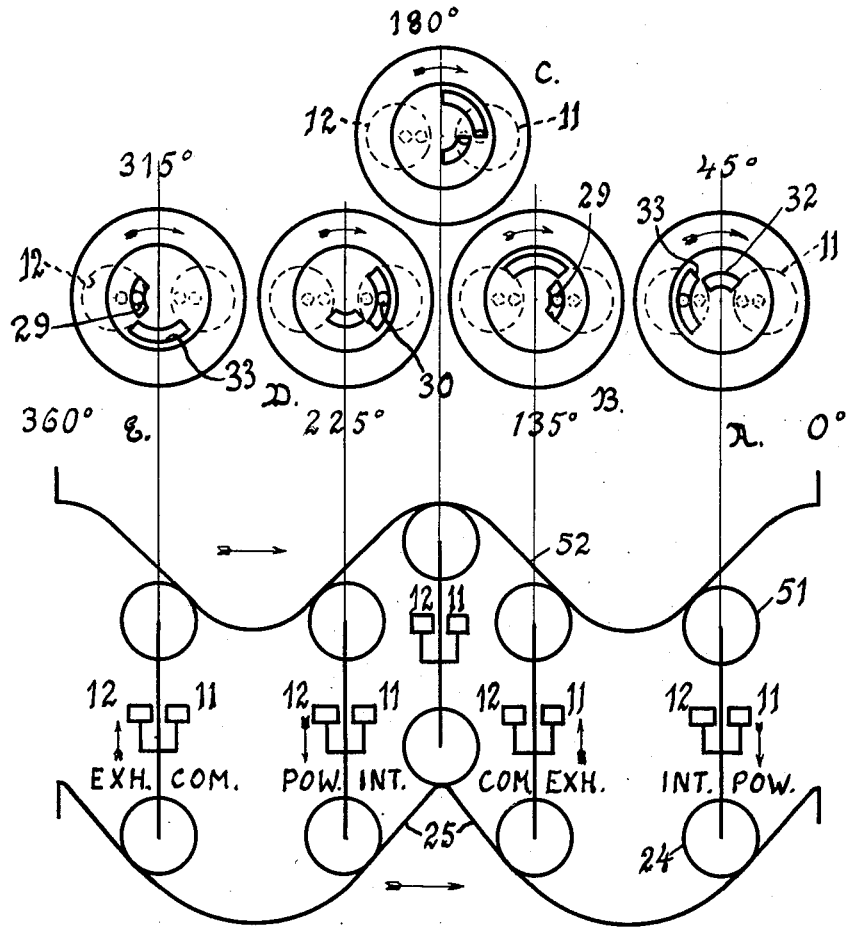

2,783,751
INTERNAL COMBUSTION ENGINE

Paul Karlan, Mount Vernon, N. Y.

Application July 10, 1956, Serial No. 596,953

2 Claims. (Cl. 123—58)

My invention relates to two identical units which are coupled to reciprocate in opposite directions to balance each other. The two units being identical, only one is illustrated and described in detail.

An object of the invention is to provide a unit having two diametrically opposite cylinders each provided with a piston, the two pistons being coupled to reciprocate in the same direction at same speed during the different cycles in the cylinders of the unit.

Another object of the invention is to provide a unit simple in construction and operation for moving the pistons in unison in the same directions parallel to the axis of the drive shaft.

A further object of the invention is to provide a rotary disc valve for controlling the cycles of the unit in both cylinders.

A still further object is to provide sliding guide rods coupled to the pistons and disposed circumferentially about the axis of the drive shaft to move with the pistons.

Another object is to provide cams keyed to the drive shaft at opposite ends of the shaft to engage rollers coupled to the guide rods.

Other objects of the invention will appear from the description and drawings forming the specifications in which Figure 1 is a top view of the units partially in section on line 1—1, Fig. 3;

Figure 2 is a head end elevation of the unit with a portion of the cam broken off;

Figure 3 is the rear end elevation of the unit partially in section on lines 3—3, Fig. 1;

Figure 4 is a cross section of the unit on lines 4—4, Fig. 1;

Figure 5 is a cross section of the unit on lines 5—5, Fig. 1;

Figure 6 shows the development of the cams used with diagrammatic views of pistons' position at 90° intervals; and Figure 7 is a diagram showing two units coupled to provide a balanced engine.

Referring to the drawing, 10 is a block having two cylindrical bores 11 and 12 diametrically opposite and open at both ends of the block. A central open end bore 13 is also formed in the block to run parallel and equidistant from bores 11 and 12. A drive shaft 14 having an enlarged elongated portion 15 between the ends thereof is fitted into the bore 13 to revolve therein. Suitable roller thrust bearings 16 are mounted on shaft 14 to butt the corresponding ends of portion 15 and to engage the central bore 13 at the ends thereof to be flush with the adjacent end faces 17 and 18 of the block 10. An end plate 19 is bolted to the face 18 of the block 10 fitting over the adjacent end of drive shaft 14 so as to permit the shaft to turn freely therein and to lock the adjacent bearing 16 in bore 13. The plate 19 has openings 11' and 12' therein registering with cylindrical bores 11 and 12 respectively.

A piston 20 is housed in bore 11 and a piston 21 is housed in bore 12. The ends 20' and 21' of the respective piston rods project out of the opening 11' and 12' of plate 19. The said piston rods ends are bolted to a connecting plate 22, through which the shaft 14 projects permitting the shaft 14 to turn freely in said connecting plate 22. Two diametrically opposite roller brackets 23 are bolted to the outer face of the connecting plate 22 so that the roller 24 of each bracket runs on the end race 25 of a cam 26 coupled to proximate end of drive shaft 14 to turn with it. See Figs. 1 and 3.

The end face 17 of block 10 is covered by a head plate 27 through which the drive shaft 14 projects and with which it is concentric and free to turn therein, see Fig. 1. Said head plate butting the proximate roller thrust bearing 16 with its inner face in the bore 13 of the block 10; so that longitudinal displacement of the shaft is arrested. The head plate 27 on its outer face has a circular recess 28 concentric with the shaft, see Fig. 5. The bottom of the recess has four diametrically aligning openings, two of each side of the center; the two nearer the center being the exhaust openings 29 and the others the inlet openings 30. Each pair entering the proximate cylinder.

A disc valve 31 is housed in recess 28 to turn with the shaft 14. It has two arched slots 32 and 33, each slot within a 90° angle but of different radii. The slot 32 of the shorter radius corresponding to the radial distance of the exhaust openings 29 and the slot 33 of the larger radius corresponding to the radial distance of the inlet openings 30. The two slots 32 and 33 lie in adjacent quadrants of the disc. A collar 34 keyed to the shaft 14 to turn therewith has a pin 35 extending from the face of the collar to engage an opening 36 in the disc valve 31 whereby the disc valve 31 revolves with the shaft 14, see Figs. 1 and 5.

An end plate 37 having a central opening 34' for the collar 34, said plate permits the collar 34 to turn freely therein. The inner face of end plate 37 has openings 38 and 39 connected by channels 40 and 41 to exhaust 42 and intake 43 respectively leading to manifolds not shown. By revolving, the disc valve connects the intake and exhaust openings at proper intervals with the cylinders 11 and 12. The end plate 37 has spark plug passages 44, diametrically opposite and in register with threaded holes 45 in head plate 27 leading into corresponding cylinders. A spark plug 46 is secured in corresponding hole 45.

The head plate 27 with end plates 19 and 37 are secured to the block 10 by bolts 47 disposed circumferentially about the outer faces of said plate. The connecting plate 22 is coupled to a similar connecting plate 48 by rods 49 mounted to slide in block 10. Said rods are disposed circumferentially about the drive shaft 14, and are preferably in diametrical opposition, therefore, there is an even number of rods 49 and not less than four. The connecting plates 22 and 48 being tied to the piston rods 20' and 21' will be reciprocated, the rods 49 serving as guides.

The connecting plate 48 has two diametrically opposite roller brackets 50 on its outer face with corresponding rollers 51 being in engagement with the end race 52 of a cam 53 mounted to rotate with the shaft 14. The rollers 51 are on a diameter at right angles to the diameter on which the rollers 24 are aligned, with cam 26.

No timing device for igniting the fuel charge has been illustrated or described for it forms no part of the invention.

As shown in Fig. 6 the pistons are shown diagrammatically on the mid-stroke at A, B, D and E. At C the pistons are shown at end of stroke at the head plate 37. As the disc valve 31 turns with the shaft in the direction of the arrow from 0° through an angle of 45° the cylinder 12 is at half of the intake stroke while cylinder 11 is at half of the power stroke. As the disc valve turns through an angle of 135°, the cylinder 12 will be under compression stroke while cylinder 11 exhausts. At C the disc valve has turned through 180°. The spark plug of cylinder 12 fires and cylinder 11 starts the intake stroke. At D the disc valve moved through an angle of 225°. The cylinder 12 is on its working stroke while cylinder 11 is on its intake stroke. At E the disc valve has moved through an angle of 315° bringing cylinder 12 into the exhaust stroke while cylinder 11 is under compression. From the diagram it is evident that four cycles are completed in two cylinders in one revolution of the cams.

The two cam races 25 and 52 are complementary to each other with reference to the rollers 24 and 51 respectively that actuate the reciprocating parts of the unit. The race 52 of cam 53 is formed first. In it, the low and high points of the race 52 are circular track parts interconnected by tangents track parts. From the formed cam race 52, the race 25 of cam 26 is generated by a reciprocating tracer following the race 52.

It is to be noted that the reciprocating parts of the engine unit comprises pistons 11 and 12; connecting plates 22 and 48; sliding rods 49 and roller brackets 23 and 51, all interconnected rigidly to move as a unit. The rotating parts of the engine unit are formed by shaft 14 and cams 26 and 53 interconnected rigidly, with the disc valve 31 constrained to revolve with the shaft. The torque on each cam 26 and 23 by the corresponding rollers 24 and 51 is 180° apart at all times. This torque and side pressure is taken by the sliding rods 49.

The unit I have described is an internal combustion engine that has the reciprocating parts unbalanced. To obtain a balanced engine: I combine two such units as described and illustrated in Fig. 7. The direction of rotation of a unit is controlled by the intake and exhaust openings of the disc valve with reference to the openings to the cylinders. The direction of rotation of a unit as described may be reversed by reversing the disc valve in its seat in the head plate.

As shown in Fig. 7 two identical units are coupled to reciprocate in opposite directions with the cylinders of the units in alignment, the disc valve of the two units are synchronized to provide identical cycles in the aligning cylinders to obtain the maximum balance of the reciprocating parts of the two units. As shown the cams 26 of the two units are coupled to rotate as a unit. Any even number of engine units may be arranged to drive a common shaft.

I claim:

1. In an internal combustion engine a block having an axial bore and two cylindrical bores diametrically opposite and parallel with the axial bore, a piston in each cylinder, a head plate closing the cylindrical bores at one end of the block and having a central opening coaxial with the axial bore, a piston rod from each piston projecting out of the open end of the corresponding cylinder bore, guide rods mounted to reciprocate in the block parallel to the axial bore and extending beyond the head plate and the other end of the block, a plate coupled to the projecting ends of the piston rods and to the proximate ends of the guide rods, a second plate coupled to the ends of the guide rods beyond the head plate; said piston rods, guide rods and plates being adapted to reciprocate as a unit, a shaft mounted to revolve in the axial bore of the block and extending through the plates free to revolve therein, an end cam at each end of the shaft coupled to revolve therewith, a pair of spaced coaxial rollers carried by each plate and in engagement with the proximate cam, and means for supplying and igniting fuel in the cylinder at predetermined intervals provided in said head plate.

2. In combination of claim 1 where, the axis of rotation of the pairs of spaced rollers on the two plates being at right angles.

References Cited in the file of this patent

UNITED STATES PATENTS

| 1,183,777 | Soules | May 16, 1916 |
| 1,390,034 | Howard | Sept. 6, 1921 |

FOREIGN PATENTS

| 104,049 | Germany | July 12, 1899 |